(12) United States Patent
Sahlgren et al.

(10) Patent No.: US 7,046,866 B2
(45) Date of Patent: May 16, 2006

(54) SYSTEM AND METHOD FOR FABRICATING BRAGG GRATINGS WITH OVERLAPPING EXPOSURES

(75) Inventors: Bengt Sahlgren, Saltsjö-Boo (SE); Ingemar Petermann, Österskär (SE)

(73) Assignee: Proximon Fiber Systems AB, Kista (SE)

( * ) Notice: Subject to any disclaimer, the term of this patent is extended or adjusted under 35 U.S.C. 154(b) by 0 days.

(21) Appl. No.: 10/469,953

(22) PCT Filed: Mar. 6, 2002

(86) PCT No.: PCT/SE02/00386

§ 371 (c)(1),
(2), (4) Date: Mar. 23, 2004

(87) PCT Pub. No.: WO02/071114

PCT Pub. Date: Sep. 12, 2002

(65) Prior Publication Data

US 2004/0156586 A1    Aug. 12, 2004

(30) Foreign Application Priority Data

Mar. 8, 2001   (SE) ................................. 0100790

(51) Int. Cl.
*G02F 1/295* (2006.01)

(52) U.S. Cl. ........................................................ 385/10

(58) Field of Classification Search .................. 385/37, 385/123–128; 65/385; 438/32
See application file for complete search history.

(56) References Cited

U.S. PATENT DOCUMENTS

| 5,042,897 | A | 8/1991 | Meltz et al. |
| 5,730,888 | A | 3/1998 | Byron |
| 6,694,075 | B1 * | 2/2004 | Bhatia et al. .................. 385/37 |
| 6,882,477 | B1 * | 4/2005 | Schattenburg et al. ...... 359/577 |

FOREIGN PATENT DOCUMENTS

| EP | 0978738 | 2/2000 |
| WO | 9721120 | 6/1997 |
| WO | WO99/63371 | * 12/1999 |

* cited by examiner

*Primary Examiner*—Kaveh Kianni
*Assistant Examiner*—Timothy Rude
(74) *Attorney, Agent, or Firm*—Harness, Dickey & Pierce, P.L.C.

(57) ABSTRACT

A novel method based on sequential writing for fabricating of advanced fiber Bragg gratings is disclosed. As opposed to already presented sequential methods, this scheme uses a continuous wave UV laser source and allows for a very precise control and repetitively of the formation of the gratings. Furthermore, one can use high average irradiances without destroying the fiber, resulting in a dramatical shortening of fabricating times for complex gratings.

20 Claims, 10 Drawing Sheets

SYSTEM AND METHOD FOR FABRICATING BRAGG GRATINGS WITH OVERLAPPING EXPOSURES

FIELD OF THE INVENTION

The present invention relates to a method for photo-inducing a grating in an optical fiber by simultaneously exposing the fiber with two mutually coherent light beams which intersect with an angle and interfere in a predetermined region of the fiber so as to create an interference pattern along a longitudinal axis of the fiber and translating the fiber essentially in the direction of the longitudinal axis. The invention further relates to an apparatus for photo-inducing a grating in an optical fiber comprising a source for emitting light, is a beam splitter for forming two mutually coherent light beams, a fiber holder for holding the fiber during exposure, means for moving the fiber essentially in the direction of a longitudinal axis of the fiber through an exposing area and a projection system for making the beams intersect with an angle in the exposure area and thereby to interfere in a predetermined region of the fiber so as to create an interference pattern along the longitudinal axis of the fiber.

BACKGROUND OF THE INVENTION

There is a rapidly growing demand for high-quality optical Bragg gratings with arbitrary phase and index profiles, as these gratings are key elements in many components that are used in WDM networks. Over the past few years, several methods that improve the quality and the flexibility in the grating fabrication process have been developed. A straightforward approach is to scan a UV beam over a long phase mask in a fixed relative position to the fiber [1]. Non-uniform profiles can in this case be fabricated either by post processing the illuminated region [2] or by using a phase mask that contains the appropriate structure [3]. Complex grating structures can also be synthesized by moving the fiber slightly relative to the phase mask during the scan [4].

In 1995, a novel versatile sequential technique for venting long and complex fiber gratings was demonstrated [5], [6]. The idea was to expose a large number of small partially overlapping subgratings—each containing a few hundred periods or less—in sequence; where advanced properties such as chirp, phase shifts and apodization were introduced by adjusting the phase offset and pitch of the subgratings. The flexibility of the method relies on the fact that all grating parameters are accessible in the control software and no change of hardware such as different kinds of phase masks are needed in order to fabricate gratings of arbitrary shapes.

In the setup that was used in Ref. [5] and [6], each subgrating was created by exposing the fiber with a short UV pulse while the fiber itself was translated at a constant speed. The UV pulses were triggered by the position of the fiber relative the UV beams, which was measured by a standard helium-neon laser interferometer. However, there are several drawbacks with these previously known methods. For example, the pulse energy exhibit fairly large fluctuations, which introduces amplitude noise in the grating structure. Moreover, it is necessary to use a low average pulse energy, as optical damage otherwise may be induced in the fiber. The velocity of the translation must additionally be kept low in comparison to the pulse length to maintain good visibility. For strong gratings the fiber, therefore, has to be exposed several times with low energy instead of a single time with high energy. The velocity of the translation must additionally be kept low in comparison to the pulse length to maintain good visibility. Hence the entire writing process tends to become rather time consuming and costly. A slow velocity also results in an increase of noise due to temperature variations in the fiber. The influence of the noise due to temperature variations in the fiber will increase the slower the fiber moves. Hence, it is difficult to control the pulse shape and pulse intensity appropriately in said known methods. Further, the most of the UV radiation is not effectively used in the grating formation process, rendering the process even more inefficient and costly.

SUMMARY OF THE INVENTION

It is therefore an object of the present invention to provide a method and an apparatus for photo-inducing a grating in an optical fiber, which alleviates the above-mentioned problems of the prior art.

This object is achieved with an apparatus and a method as defined in the appended claims.

According to the invention there is provided a method for photo-inducing a grating in an optical fiber comprising the steps of simultaneously exposing the fiber with two mutually coherent light beams which intersects with an angle and interfere in a predetermined region of the fiber so as to create an interference pattern along a longitudinal axis of the fiber; and translating the fiber essentially in the direction of the longitudinal axis. The fiber is, at least during a certain time period, exposed with continuous light, under which time period the beams are controlled in order to translate the interference pattern in a direction of the longitudinal axis.

The invention presents a novel method for fabrication of advanced fiber Bragg gratings, and enabling sequential writing. As opposed to prior art methods, this scheme uses a continuous wave UV laser source and allows for a very precise control and repetitivity of the formation of gratings and subgratings. Furthermore, the inventive method makes it possible to use high average irradiances without destroying the fiber, resulting in a dramatic shortening of fabrication times for complex gratings.

Light is in the context of the application not limited to mean visible light, but a wide range of wavelengths from infrared (IR) to extreme UV.

Further, with optical fiber is in the meaning of this application to be understood any kind of optical waveguide made of a material which has a refractive index that can be permanently changed by exposure to light of at least one predetermined wavelength.

By photo-induction is to be understood the process of exposing the optical fiber of the above-mentioned type with light of the predetermined wavelength so as to form a permanent refractive index variation in the fiber.

Preferably, the interference is translated to follow the fiber movement at least part of said time period. Hereby, the fringes of the interference pattern follow the fiber during this time, providing distinct and precise gratings.

Particularly, it is preferred that the interference pattern is controlled to sequentially follow the fiber movement and to be reversed in the opposite direction, respectively. Hereby, a grating is provided comprising several subgratings exposed in sequence after each other during the translation of the fiber. Further, it is preferred that the reversion distance is less than the extension of the interference pattern, whereby the exposure following the fiber are at least partly overlapping. The time of reversion of the interference pattern is preferably significantly shorter than the time of following the fiber movement. Hereby, the exposure of the fiber during the reversion does not significantly affect the photo-induction of the grating.

Further, the interference pattern is preferably reversed a distance approximately being equal to an integer multiplied by the distance between adjacent fringes in the interference pattern. Hereby, the subgratings are synchronized with each other. However, it is also possible to reverse the interference pattern a distance approximately being equal to an integer multiplied by the distance between adjacent fringes in the interference pattern, but with a predetermined offset. Such an offset could be made in real-time, and provides the possibility of introducing precisely controlled advanced properties such as chirp, phase shifts and apodization.

Still further, the position of the fiber is preferably continuously determined and the position of the fiber used for triggering reversion of the interference pattern. Hereby, a more precise photo-induction is possible, since the interference pattern could normally be controlled more precisely than the fiber movement. The fiber is preferably translated at an essentially constant speed during the exposure. However, the speed of the fiber translation could be controlled in accordance with the translation of the interference pattern when moved in the same direction as the fiber.

The translation of the interference pattern is preferably performed by means of a controlled variation of a phase shift between the interfering beams. This enables a very precisely controlled translation of the interference pattern, with few mechanically moving parts.

The invention also relates to an apparatus for photo-inducing a grating in an optical fiber comprising a source for emitting light; a beam splitter for forming two mutually coherent light beams; a fiber holder for holding the fiber during exposure; means for moving the fiber essentially in the direction of a longitudinal axis of the fiber through an exposing area; and a projection system for making the beams intersect with an angle in the exposure area and thereby to interfere in a predetermined region of the fiber so as to create an interference pattern along the longitudinal axis of the fiber. The light source is a continuous wave light source, and the projection system further comprises means for translating the interference pattern in a direction of the longitudinal axis.

With this apparatus, the method discussed above could be executed. Accordingly, a novel apparatus is presented, preferably based on sequential writing, for fabrication of advanced fiber Bragg gratings. As opposed to prior art apparatuses, a continuous wave light source is used, which allows for a very precise control and repetitivity of the formation of gratings and subgratings. Furthermore, the inventive apparatus makes it possible to use high average irradiances without destroying the fiber, resulting in a dramatic shortening of fabrication times for complex gratings. Furthermore, the invention provides a major improvement of the grating quality as compared to other sequential methods.

Preferably, the apparatus further comprises a control unit for controlling the translation of the interference pattern. This unit is preferably connected to means for determining the position of the fiber, whereby the translation of the interference pattern could be precisely controlled accordingly. Said means for determining the position of the fiber could comprise an interferometer, and preferably a heterodyne interference detection system.

In a preferred embodiment of the invention, the means for translating the interference pattern comprises means for introduction of a controlled variation of a phase shift between the interfering beams in the projection system. Said means for introduction of a phase shifts could comprise at least one mirror in the projection path of at least one of the beams, said mirror being displaceable in the beam direction, by e.g. a piezo electric element. This enables a very precisely controlled translation of the interference pattern, with few mechanically moving parts.

The piezo electric element is preferably controlled by a sawtooth signal supplied by the control unit matching the velocity of the fringes and the fiber over a certain distance, and preferably a distance corresponding the distance between two adjacent fringes. Hereby, the interference pattern could be controlled to sequentially follow the fiber movement and to be reversed in the opposite direction, respectively. Hereby, a grating is provided comprising several subgratings exposed in sequence after each other during the translation of the fiber.

Still further, the projection system may comprise lenses for focusing the interfering beams to a line focus at least partly coinciding with the core of the fiber, said lenses being arranged after said means for introduction of a controlled variation of the phase shift.

In a preferred embodiment, the projection system further comprises means for altering the angle between the interfering beams in order to change the period of the interference fringes. This alteration could either be made between writing steps or during the writing. The means for altering the angle between the interfering beams is preferably adapted to change the angle symmetrically for both beams.

BRIEF DESCRIPTION OF THE DRAWINGS

For exemplifying purposes, the invention will be described in closer detail in the following with reference to embodiments thereof illustrated in the attached drawings, wherein.

DESCRIPTION OF PREFERRED EMBODIMENTS

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1A:
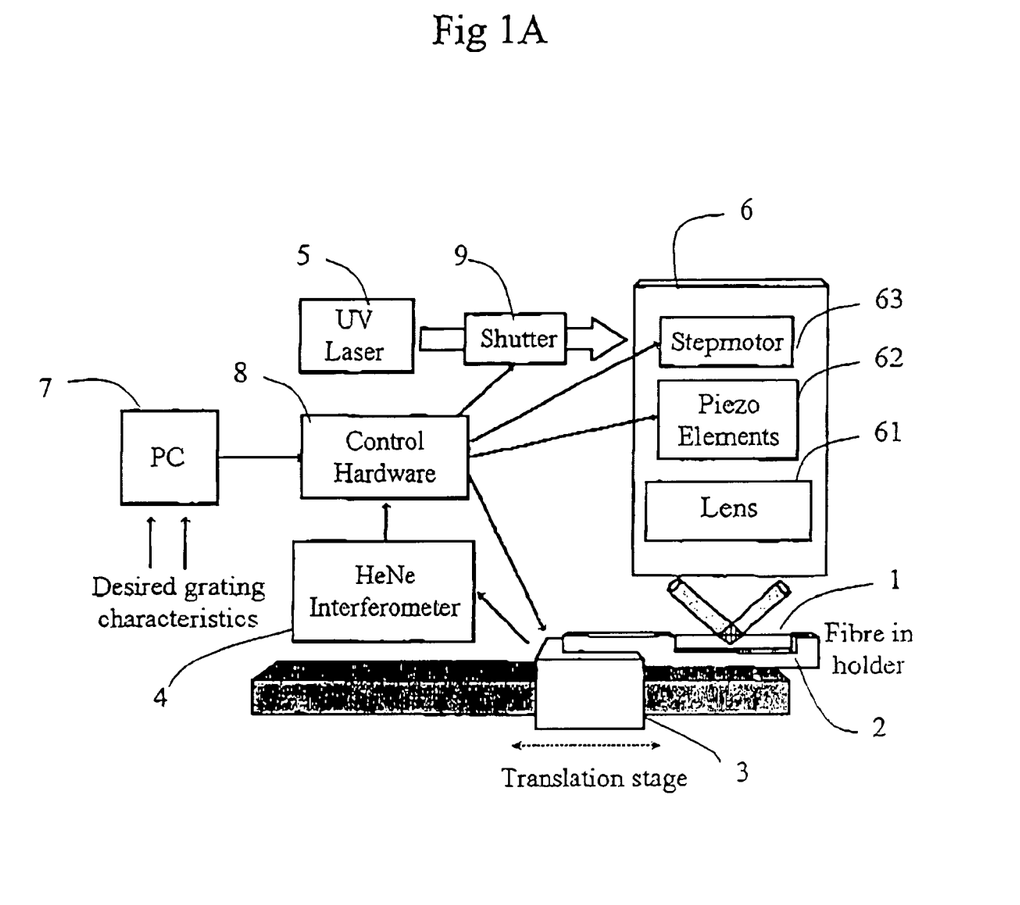
FIG. 1A is a schematic drawing of a fiber Bragg grating fabrication system according to an embodiment according to the invention.

The setup according to an embodiment of the invention is illustrated in FIG. 1A. A fiber 1 to be exposed is placed in a fiber holder 2 mounted on an airbearing born carriage 3, which is translated by a feedback-controlled linear drive. The position of the translator stage relative the UV interference pattern is measured with a heterodyne interference detection system 4 utilizing a He—Ne laser as light source. The resulting spatial resolution is approximately 0.6 nm, available over the translation length of about half a meter.

A light source 5, e.g. a frequency-doubled argon-ion laser emits light, such as 100-mW radiation of wavelength 244 nm, into a beam splitter, such as a half transparent mirror or prism, or a phase-mask, where it is divided into two coherent beams. Thereafter, the beams are launched into a double Sagnac interferometer 6, which generates the interference pattern forming the grating. One or several cylindrical lenses 61 focus the two interfering beams into a line focus that coincides with the core of the fiber 1. Longitudinally, the focus could extend over about 100 microns, which roughly corresponds to 200 fringes for a Bragg wavelength of 1550 nm resonance wavelength.

Since the fiber is moving, and preferably at a constant speed, the pattern has to follow the fiber movement during exposure. To accomplish this, two mirrors are mounted on piezo crystals 62 in the UV interferometer, one in each beam path. A translation of the mirrors introduces a phase shift between the interfering beams, which shifts the fringe pattern under the envelope defined by the focus. The pattern thus moves with the fiber, continuously exposing the fiber. Since the piezo elements cannot move infinitely long, they are fed with a sawtooth signal so that the fringes are perfectly following the fiber over some distance, typically one fringe. At the end of the voltage ramp in each period, the fringes jump back to the original position. During this short moment, the fiber is evenly exposed giving a slight increase in dc index change. Each new period of the sawtooth signal results in a new "subexposure" of the fiber, corresponding to a new subgrating in earlier sequencial methods. The properties of the piezo crystals limit the maximum writing speed, as it is essential that the extent of the ringing after the jump is much less than the period time of the signal. Otherwise, the modulation depth of the generated grating may degrade. The maximum writing speed that could be obtained in our setup was of the order of centimeters per second. In practice, the handling of the fiber before and after the exposure represents the actual time limiting factor in the grating fabrication process. But with the above described setup a maximum writing speed of at least the order of centimeters per second can be obtained.

The entire grating structure is determined by the positions of the jumps, i.e. sign reversals of the sawtooth signal as described in detail below. These positions are calculated in advance by a calculation unit 7, such as a conventional personal computer, and fed into a control unit 8 that eventually performs the sign reversions when the desired positions are reached. The control unit is preferably electronically implemented in hardware.

A step motor 63 controlling the angle between the interfering beams could be used to change the period of the interference fringes to match the desired local pitch of the grating. The angle change is preferably performed symmetrically for both beams so that the center fringe does not move its position. In a preferred setup, the resolution for this pitch variation is about 1.4 pm in resonant wavelength. In order to prevent unwanted exposure outside the actual grating, the system also comprises a controllable shutter 9 in the UV beam path that is only open within the grating region during the writing.

Figure 1B:
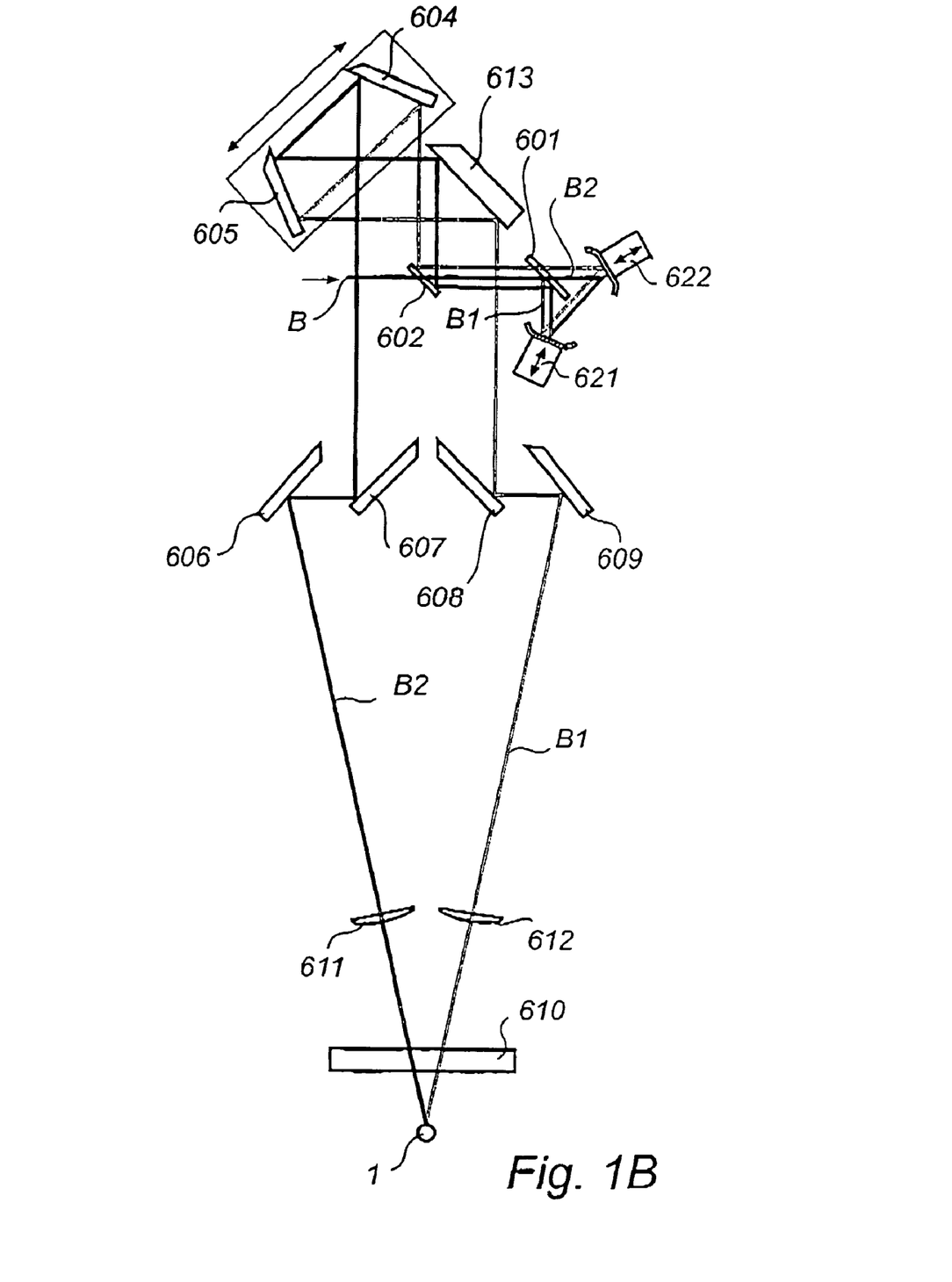
FIG. 1B is a schematic drawing of the optical path in the projection system in the fiber Bragg grating fabrication system according to FIG. 1A.

An example of the optical path in the projection system 6 used in an apparatus according to the invention is illustrated in FIG. 1B. The beam B from the laser 5 is directed to a beam-splitter 601, such as a semitransparent mirror, where it is separated into two beams B1, B2. Thereafter the beams are led in different paths in the double Sagnac interferometer by means of reflecting mirrors 601–609 or the like. Further, movable mirrors 621, 622 are introduced in the optical path for controlled introduction of a phase-difference between the beams. The displaceable mirrors may be mounted on piezoelectric elements, as is discussed above.

Thereafter, the beams B1, B2 are directed to the lenses 610–612 to be focused on the fiber 1.

The reflecting elements 604, 605 are preferably displaceable by means of the step motor 63, as previously described, for controlling of the angle between the interfering beams. Preferably, the mirrors 604, 605 are mounted on a holder plate or the like, and consequently movable in a coordinated fashion.

Realisation of Complex Profiles

Figure 2:
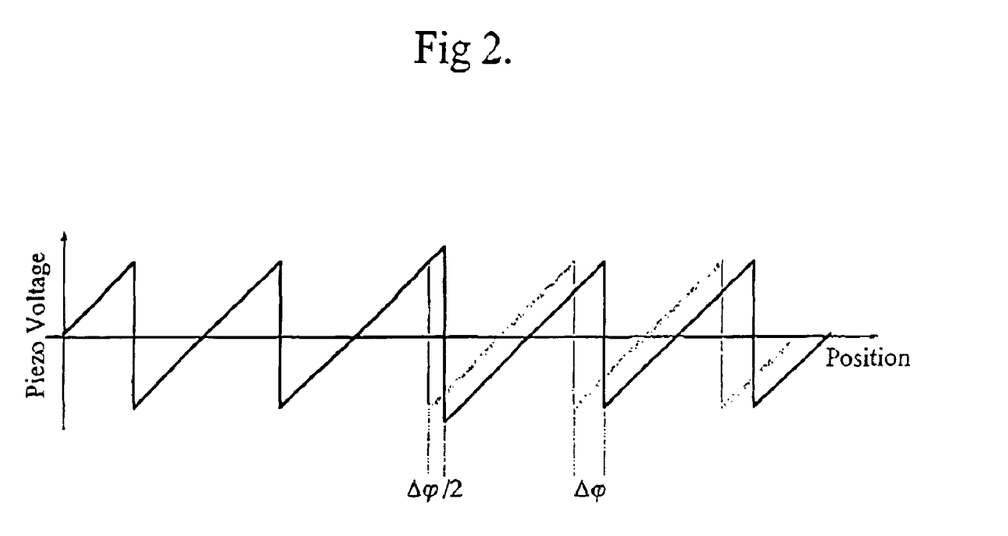
FIG. 2 is an excerpt from a sawtooth waveform used to drive the piezo elements for a uniform grating with a phase shift $\Delta\phi$ (black line) in the system according to FIG. 1. The grey line shows the continuation of the waveform without the phase shift.

For simple unchirped and unapodized gratings, all exposed fringes are in phase and the sawtooth jumps will appear at the same integral number of grating pitches throughout the writing process. Adding a (positive) phase shift, e.g. for DFB structures, merely corresponds to delaying the lump somewhat, as is illustrated in FIG. 2. The interference pattern will then follow the fiber a little bit longer than otherwise at the position of the phase shift and make a correspondingly larger jump back. If the jump is delayed by $\Delta\phi/2$ the resulting phase shift in the grating will be $\Delta\phi$.

An important issue is the ability to apodize gratings in order to suppress unwanted side lobes in the reflection spectrum. According to the invention this is realised by so-called dithering. The visibility of the grating is changed by alternating the phase offset of the subexposures between two different values, thus in fact superposing two uniform gratings with the same properties, but phase-shifted relative to each other. Choosing phase offsets $\pm\Delta\phi$ will give a total index variation of the form $$\Delta n(X) \propto \sin(kx-\Delta\phi)+\sin(kx+\Delta\phi) \propto \cos(\Delta\phi)\sin(kx),$$

where x is the position along the fiber, $k=2\pi/\Lambda$ and $\Lambda$ is the grating pitch. As can be seen, the phase term directly determines the strength of the index variation.

This is the same principle as was used in Ref. 6, but in the present setup, where moving fringes are used, the UV dose given in each of the two phase shifted gratings is easily and precisely controlled. If the dose varies from subgrating to subgrating, which is the case when a pulsed UV light source is used, noise will be introduced in both the phase and the amplitude of the grating structure.

Figure 3:
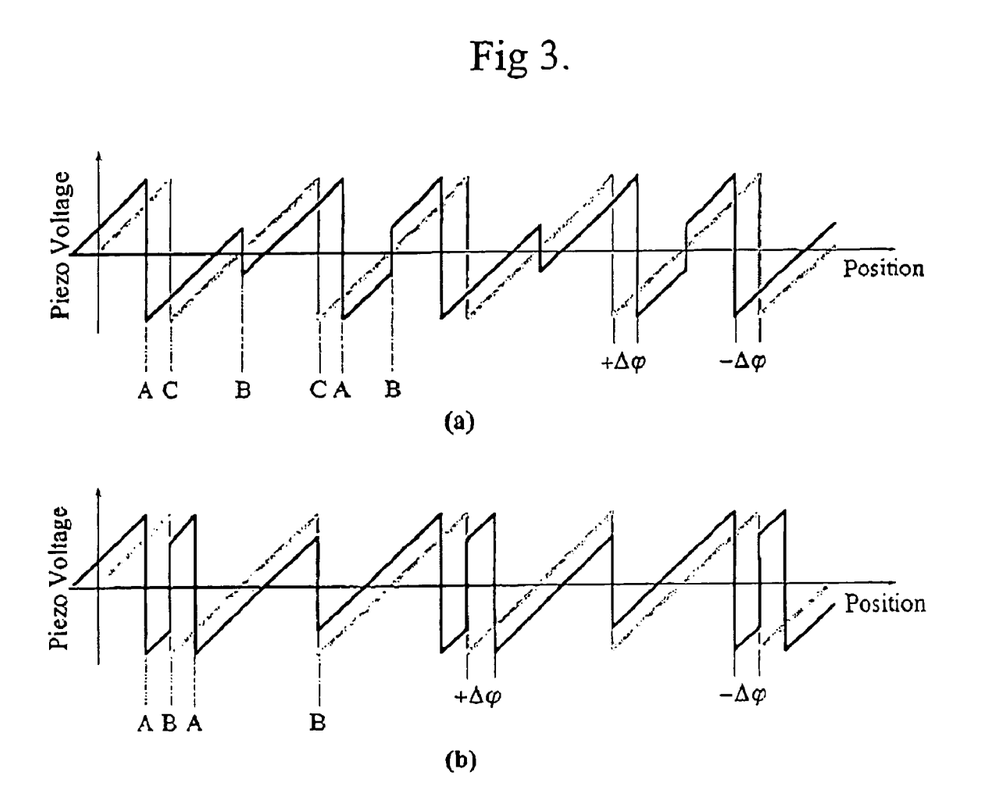
FIG. 3a shows an excerpt from the sawtooth waveform needed to drive the piezo elements for a grating with 50% visibility (black line) and the waveform resulting in an unapodized grating with the same phase (grey line) The waveform alternates between leading and lagging $\Delta\phi=\pi/3$ as compared to the unapodized case.
FIG. 3b shows the same as in FIG. 3a, but with different positions for jumping to the other phase offset. For further explanation, see text.

FIG. 3a shows the sawtooth waveform for a phase offset $\pm\pi/3$. As can be seen, it alternates between two phase-shifted versions of a uniform sawtooth wave. These waves result in two superposed gratings which add according to the above equation, giving a fringe visibility of 50%. The sign reversions at positions marked 'A' in FIG. 3a sweep the interference pattern back to expose the next part of the grating whereas the reversions at positions 'B' cause the pattern to jump to the other phase offset. By always letting the sawtooth signal follow each of the two phase shifted waveforms the same number of periods before switching to the other, an even distribution of the UV dose is ensured. The grey line indicates a waveform that would result in a maximum visibility (non-apodized) grating with the same phase as the one described above.

Since the piezo crystals have a finite response time, it is important to choose the switch positions between the two waveforms carefully. If e.g. the positions marked 'C' in FIG. 3a are used, the resulting sawtooth signal takes the form as shown in FIG. 3b. As before, the reversions at the 'A' positions correspond to sweeping back for the next subexposure and at the 'B' positions, the pattern jumps to the other phase offset. In this case, though, the sign reversions turn out to be closer spaced the smaller the phase dither $\Delta\phi$ is. Hence, the piezo crystals could impossibly respond to the signal as the visibility approaches 100%. Choosing the switch positions according to FIG. 3a instead results in reversions at an approximately constant rate, regardless of current visibility.

By continuously changing $\Delta\phi$ for every new pair of subexposures, any apodization may be created and further adding single phase shifts as described at the beginning of this section gives any phase profiles.

Chirping a grating is equivalent to continuously changing the distance between the fringes. A constant chirp, i.e. a linear increase/decrease in grating period and fringe distance, is the same as a quadratic increase/decrease in phase as compared to a non-chirped grating. If the interference pattern is focused to contain only one single fringe, it would be possible to create any chirp throughout the grating. On the other hand, the fabrication time would increase since every overlapping fringe in the apodization scheme described above must be exposed individually. Furthermore, the demand of precision of the fiber alignment increases the tighter the UV beam is focused. If the beam spot contains several fringes and the period of the interference fringes is fixed throughout the writing process, it is still possible to apply smaller chirps by merely adjusting the phase offset as long as the phase shift remains small over a length corresponding to one subexposure. Larger chirps will give an apodization effect due to overlapping of out-of-phase fringes since the actual interference fringe period differs too much from the desired grating pitch.

In order to apply larger chirps, the interference fringe period must be continuously changed during the exposure to always match the desired local grating pitch. In our setup, this is done by changing the angle between the two interfering beams with aid of the step motor described above.

With this technique, it is possible to create arbitrary chirps throughout the grating. It is imperative, that the angle adjustment is symmetric with respect to the fiber normal in the plane of incidence, otherwise the overall position of the interference pattern also changes, thus introducing phase errors in the grating structure.

Experimental Results

In order to test the equipment, several gratings were written. The interference pattern has in each case been focused to a longitudinal size of approximately 100 microns. It has proven important to use the same TV power and writing speed at each exposure and to keep the time between multiple writing passes approximately constant. If these requirements are not met, different temperatures due to different amounts of remaining heat in the fiber result in a misalignment of the fringes from pass to pass, thus causing degradation of the grating rather than reinforcement. The effect is especially prominent when writing chirped gratings.

Figure 4:
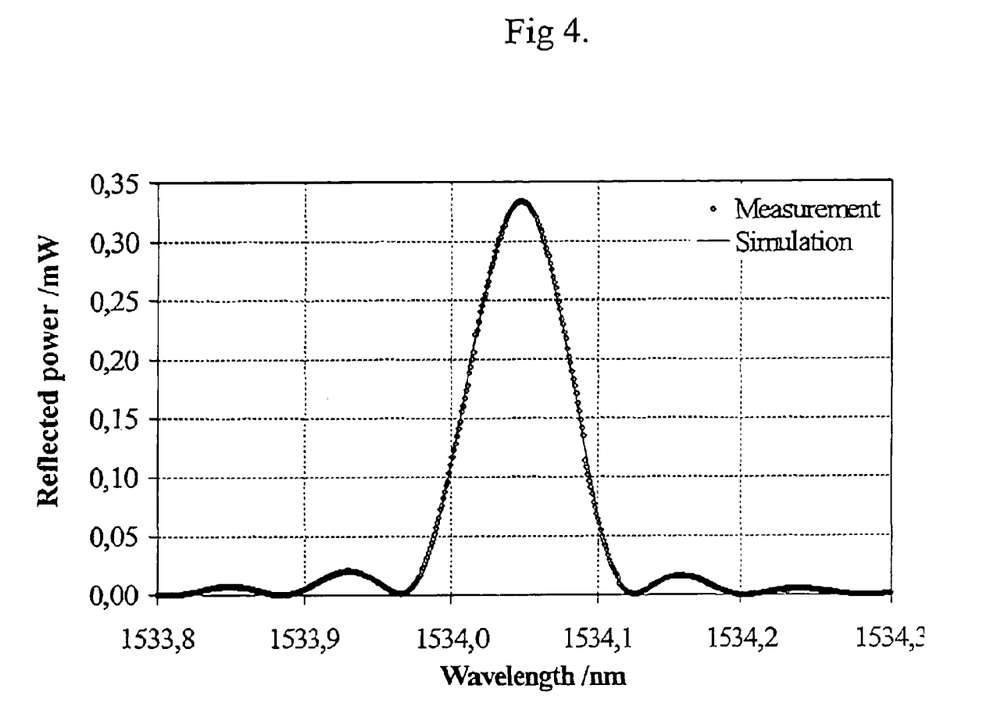
FIG. 4 is a reflection spectrum of a 10 mm long unapodized grating (diamonds) and simulated ideal response (solid line).
Figure 5:
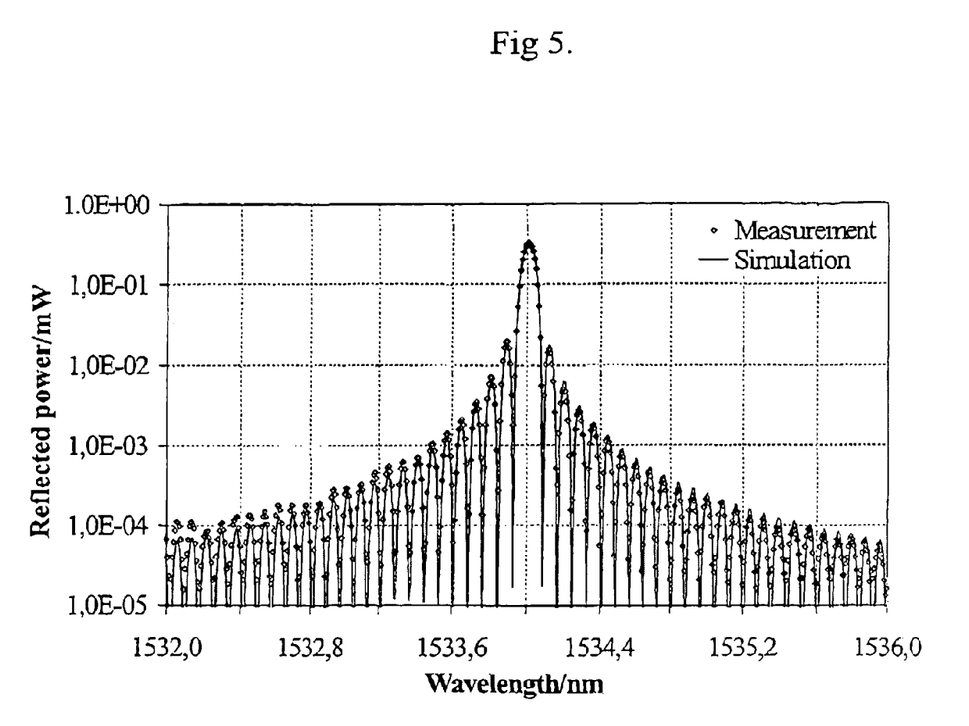
FIG. 5 is a reflection spectrum in decibel scale of the same grating as in FIG. 4 (diamonds). The simulated ideal response is shown by the solid line.

FIG. 4 shows the reflection spectrum of a 1 cm uniform unapodized grating that was exposed once at 13 mW with a speed of 5 mm/s. Using a highly sensitive hydrogen loaded fiber resulted in a grating with approximately 20% reflectivity and a modulation depth of roughly $2 \cdot 10^{-5}$. As can be seen, the sinc-shaped spectrum is in perfect agreement with the simulated ideal response of such a grating. The resemblance with the simulation is still very good far away from the main peak, as shown in FIG. 5. The nearly perfect symmetry indicates that the number of phase errors is very low.

Figure 6:
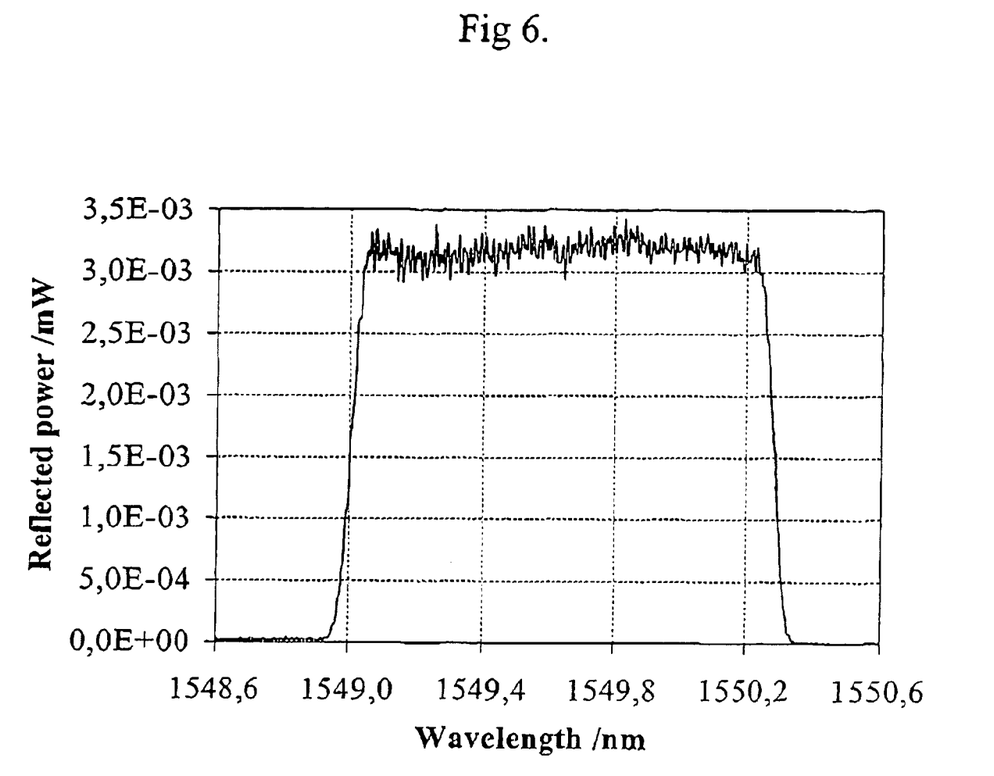
FIG. 6 is a reflection spectrum of a 40 mm long sinc apodized grating containing 7 side lobes. In order to suppress side lobes, the grating is further apodized with a super Gaussian profile.
Figure 7:
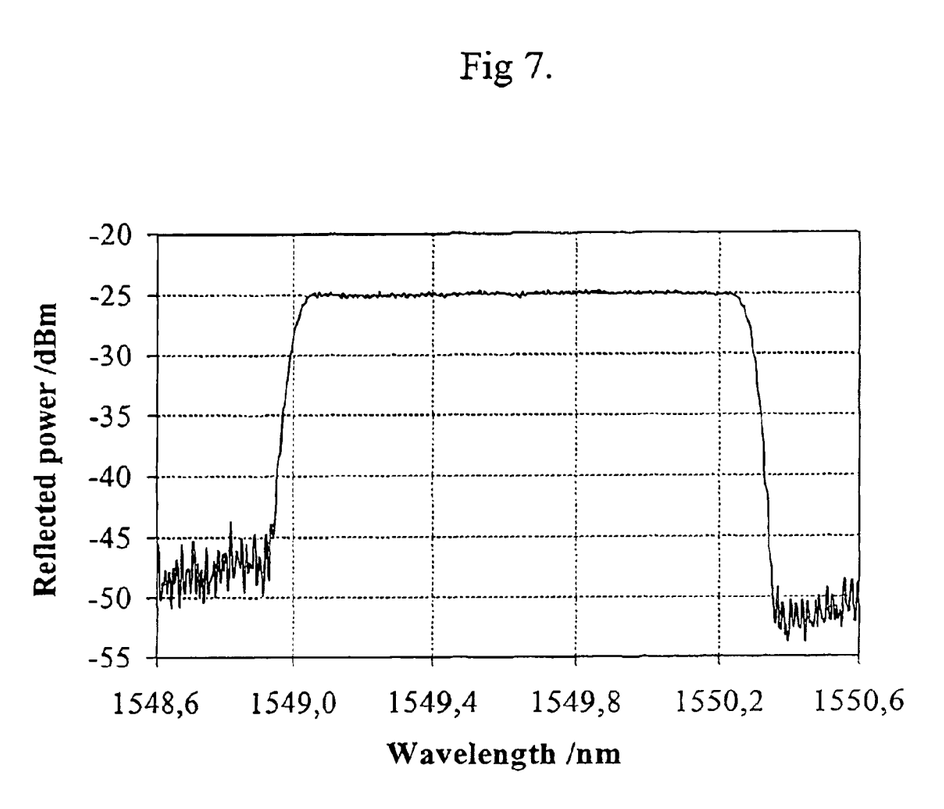
FIG. 7 is a reflection spectrums in decibel scale of the same grating as in FIG. 6. The sideband rejection is at least 20 dB.

Next, a sinc-apodized 4 cm long grating including 7 sidelobes on each side of the main peak was written in the same type of fiber as above. In order to suppress spectral sidebands, the grating was additionally apodized with a super-Gaussian profile. The resulting reflection spectrum is shown in FIG. 6. The grating was exposed 5 times at 100 mW, which gave a reflectivity of approximately 20%. The in-band noise is 10% and the sideband rejection at least 20 dB, as is illustrated in FIG. 7.

Figure 8:
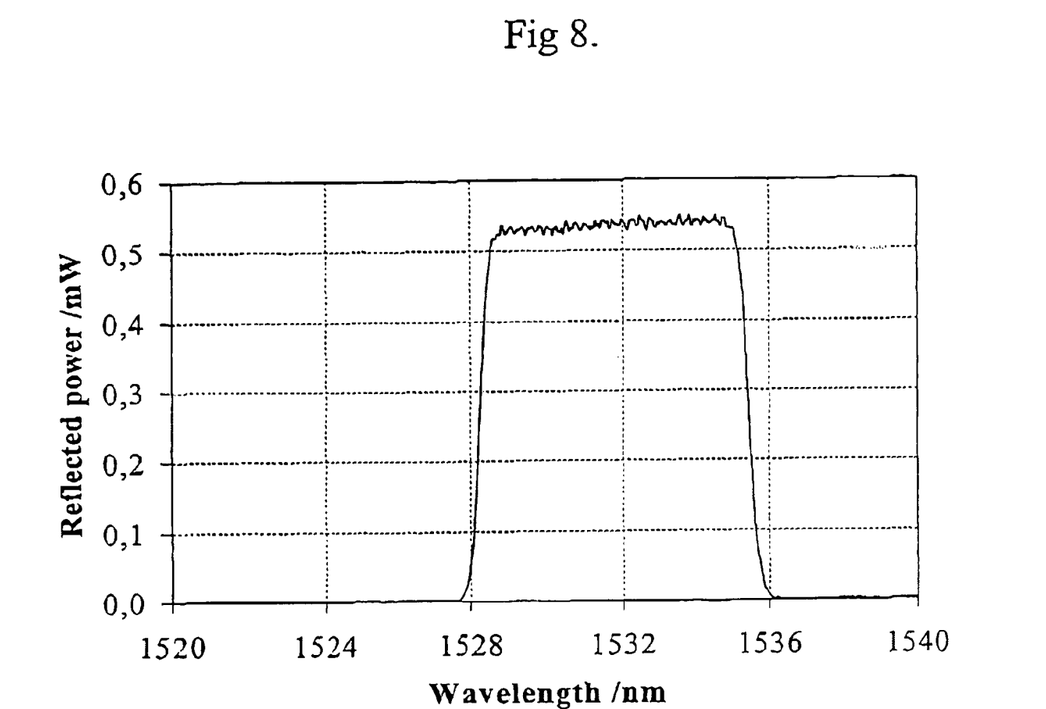
FIG. 8 is a reflection spectrum of a 20 mm long and 10 nm chirped grating with super Gaussian apodization.
Figure 9:
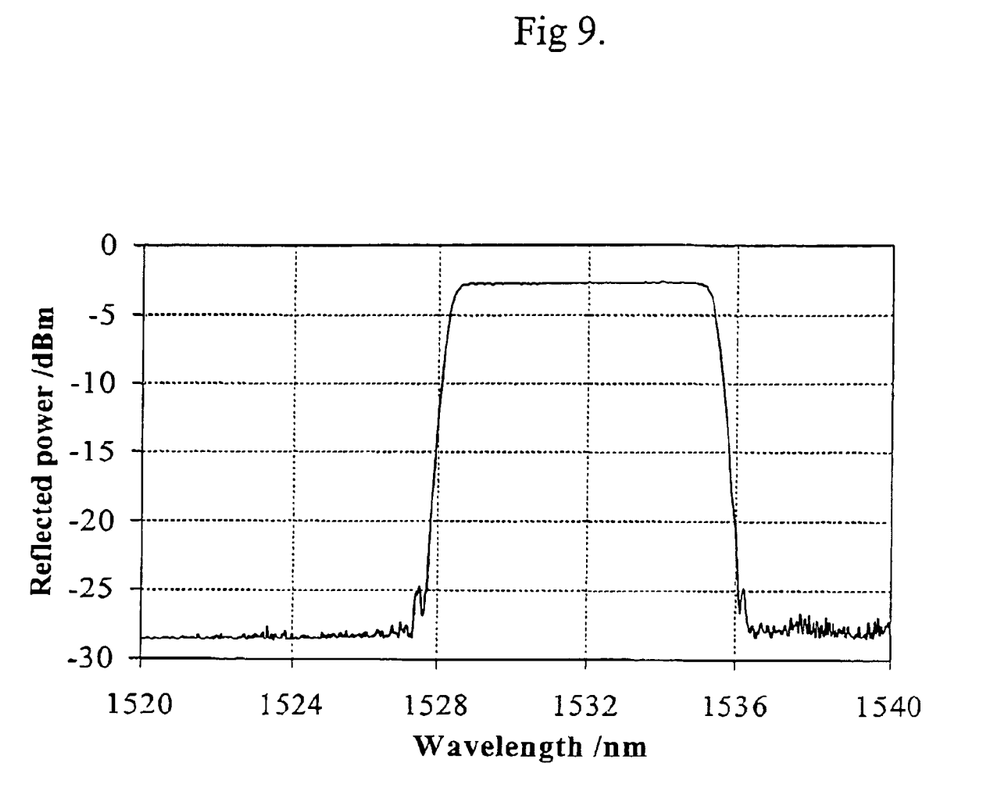
FIG. 9 is a reflection spectrum in decibel scale of the same grating as in FIG. 9. The sideband rejection is approximately 22 dB.

Finally, a 2 cm long and 10 nm chirped super-Gaussian apodized grating was written in a Redfern GF-5 fiber. The grating was exposed 10 times at 2 mm/s with 100 mW beam power. Use was made of the step motor to continuously optimize the local period. As can be seen from FIGS. 8 and 9, the filter response is very good with a sidelobe rejection of approximately 22 dB and a reflectivity close to 100%. Note also the spectral symmetry that, again, indicates a very low amount of phase errors.

Conclusions

The invention provides a novel technique for fabrication of high quality fiber Bragg gratings. By continuously moving the interference fringes of cw UV light with the moving fiber during the writing process, maximum amount of the light power is used for the actual exposure. As a result, the fabrication time for all kinds of customized gratings is greatly reduced as compared to earlier methods. The invention allows for a very precise control of grating formation, which is demonstrated by a number of realised gratings showing a very low amount of phase errors. All steps of the grating exposure are software-controlled so that any kind of phase and apodization profile can be realised by means of simple programmatic changes. The flexibility and speed of this technique make it a powerful tool for fabrication of arbitrary-shaped fiber Bragg gratings.

The invention has now been described by way of embodiments. However, many alternatives are possible. For example, different types of beam splitters are feasible, other types of means for introducing phase differences between the beams could be used instead of piezo elements, other types of means for translating the fiber could be used etc. Such alternatives are known from the prior art. It should be appreciated by someone skilled in the art that such alternatives are part of the invention, such as it is defined by the appended claims.

REFERENCES

[1] 3. Martin and F. Oulette, "Novel writing technique of long and highly reflective in-fiber gratings", Electron. Lett. 30, 811–812 (1994).

[2] R. Kashyap, P. F. McKee, R. J. Campbell and D. L. Williams. "Novel method of producing all fiber photo-induced chirped gratings", Electron. Lett. 30, 996–998 (1994).

[3] K. O. Hill, F. Bilodeau, P. Malo, T. Kitagawa, S. Theriault, D. C. Johnson, J. Albert and K . Takiguchi, "Aperiodic in-fiber Bragg gratings for optical dispersion compensation", in Proc. OFC' 94, PD-77 (1994).

[4] W. H. Loh, M. J. Cole, M. N. Zervas, S. Barcelos and R. I. Laming "Complex grating structures with uniform phase masks based on the moving fiber-scanning beam technique", Opt. Lett. 20, 2051–2053 (1995).

[5] R. Stubbe, B. Sahlgren, S. Sandgren and A. Asseh, "Novel technique for writing long superstructured fiber Bragg gratings", in Photosensitivity and Quadratic Nonlinearity in Glass Waveguides (Fundamentals and Applications), Portland, PD1 (1995).

[6] A. Asseh, H. Storøy, B. E. Sahlgren, S. Sandgren and R. A. H. Stubbe, "A writing technique for long fiber Bragg gratings with complex reflectivity profiles", J. Lightw. Techn. 15, 1419–1423 (1997).

[7] J. Skaar, B. Sahlgren, P.-Y. Fonjallaz, H. Storøy "High reflectivity fiber optic bandpass filter designed using the iterative solution to the Gel'Fand-Levitan-Marchenko equations", Opt. Lett. 23(12), 933–935 (1998).

The invention claimed is:

1. A method for photo-inducing a grating in an optical fiber comprising:
    simultaneously exposing the fiber with two mutually coherent light beams which intersect with an angle and interfere in a predetermined region of the fiber, so as to create an interference pattern along a longitudinal axis of the fiber; and
    translating the fiber essentially in the direction of the longitudinal axis;
    wherein the fiber, at least during a certain time period, is exposed with continuous light, under which time period the beams are controlled in order to translate the interference pattern in a direction of the longitudinal axis,
    wherein the interference pattern is translated to sequentially follow the fiber at least part of said time period and to be reversed in the opposite direction, respectively, and
    wherein the interference pattern is reversed a distance that is less than a longitudinal extension of the interference pattern, whereby following exposures of the fiber are at least partly overlapping.

2. The method according to claim 1, wherein the time of reversion of the interference pattern is significantly shorter than the time of following the fiber movement.

3. The method according to claim 1, wherein the interference pattern is reversed a distance approximately being equal to an integer multiplied by the distance between adjacent fringes in the interference pattern.

4. The method according to claim 1, wherein the interference pattern is reversed a distance approximately being equal to an integer multiplied by the distance between adjacent fringes in the interference pattern, but with a predetermined offset.

5. The method according to claim 1, wherein the position of the fiber is continuously determined and the position of the fiber is used for triggering reversion of the interference pattern.

6. The method according to claim 1, wherein the fiber is translated at an essentially constant speed during the exposure.

7. The method according to claim 1, wherein the speed of the fiber translation is controlled in accordance with the translation of the interference pattern when moved in the same direction as the fiber.

8. The method according to claim 1, wherein the interference pattern is translated by controlled variation of a phase shift between the interfering beams.

9. An apparatus for photo-inducing a grating in an optical fiber comprising:
    a source for emitting light;
    a beam splitter for forming two mutually coherent light beams;
    a fiber holder for holding the fiber during exposure;
    a device for moving the fiber essentially in the direction of a longitudinal axis of the fiber through an exposing area; and
    a projection system for making the beams intersect with an angle in the exposure area and thereby to interfere in a predetermined region of the fiber so as to create an interference pattern along the longitudinal axis of the fiber,
    wherein the light source is a continuous wave light source, and in that the projection system further comprises a device for translating the interference pattern in a direction of the longitudinal axis of the fiber,
    the apparatus further comprising a control unit adapted to control the translation of the interference pattern to sequentially follow the fiber and to be reversed on the opposite direction, respectively, and
    wherein the control unit is further adapted to control the interference pattern to be reversed a distance that is less than a longitudinal extension of the interference pattern, whereby following exposures of the fiber are at least partly overlapping.

10. The apparatus according to claim 9, further comprising a device for determining the position of the fiber, said device being connected to the control unit.

11. The apparatus according to claim 10, wherein the device for determining the position of the fiber comprises an interferometer, and preferably a heterodyne interference detection system.

12. The apparatus according to claim 9, wherein the control unit is adapted to control the translation of the interference pattern to sequentially follow the fiber movement and to be reversed in the opposite direction, respectively.

13. The apparatus according to claim 12, wherein the control unit is adapted to reverse the interference pattern a distance approximately being equal to an integer multiplied by the distance between adjacent fringes in the interference pattern.

14. The apparatus according to claim 9, wherein the device for translating the interference pattern comprises a device for introduction of a controlled variation of a phase shift between the interfering beams in the projection system.

15. The apparatus according to claim 14, wherein the device for introduction of a phase shifts comprises at least one mirror in the projection path of at least one of the beams, said mirror being displaceable in the beam direction.

16. The apparatus according to claim 15, wherein said at least one mirror is displaceable by a piezo electric element.

17. The apparatus according to claim 16, wherein the piezo electric element is controlled by a sawtooth signal supplied by the control unit matching the velocity of the fringes and the fiber over a certain distance, and preferably a distance corresponding to the distance between two adjacent fringes.

18. The apparatus according to claim 14, wherein the projection system further comprises lenses for focusing the interfering beams to a line focus at least partly coinciding with the core of the fiber, said lenses being arranged after said device for introduction of a controlled variation of the phase shift.

19. The apparatus according to claim 9, wherein the projection system further comprises a device for altering the angle between the interfering beams in order to change the period of the interference fringes.

20. The apparatus according to claim 19, wherein the device for altering the angle between the interfering beams is adapted to change the angle symmetrically for both beams.

* * * * *